(12) United States Patent
Neal

(10) Patent No.: US 9,597,791 B2
(45) Date of Patent: Mar. 21, 2017

(54) TOOL HOLDER

(71) Applicant: Ryan Neal, Portland, OR (US)

(72) Inventor: Ryan Neal, Portland, OR (US)

( * ) Notice: Subject to any disclaimer, the term of this patent is extended or adjusted under 35 U.S.C. 154(b) by 0 days.

(21) Appl. No.: 14/592,171

(22) Filed: Jan. 8, 2015

(65) Prior Publication Data

US 2015/0190922 A1 Jul. 9, 2015

Related U.S. Application Data

(60) Provisional application No. 61/925,146, filed on Jan. 8, 2014.

(51) Int. Cl.
| | | |
|---|---|---|
| *A47F 7/00* | (2006.01) | |
| *A47F 1/04* | (2006.01) | |
| *A47F 5/08* | (2006.01) | |
| *B25H 3/04* | (2006.01) | |
| *F16M 13/02* | (2006.01) | |

(52) U.S. Cl.
CPC .............. *B25H 3/04* (2013.01); *A47F 5/08* (2013.01); *A47F 5/0823* (2013.01); *A47F 7/0028* (2013.01); *F16M 13/022* (2013.01)

(58) Field of Classification Search
CPC . B25H 3/04; B25H 3/06; B25H 3/003; F16M 13/022; A47F 7/0021; A47F 7/0028; A47F 7/0035; A47F 5/08; A47F 5/0815; A47F 5/0823; A47F 5/083; B25B 13/56; A47B 81/005
USPC ........... 211/70.6, 70.2, 70.8, 87.01, 69, 69.8, 211/69.9, 124, 89.01, 59.1, 60.1, 66; 248/220.31, 220.41–220.43
See application file for complete search history.

(56) References Cited

U.S. PATENT DOCUMENTS

| | | | | |
|---|---|---|---|---|
| 138,676 A | * | 5/1873 | Mitchell | A01G 9/02 211/120 |
| 158,208 A | * | 12/1874 | Hall | A01G 9/02 211/67 |
| 397,723 A | * | 2/1889 | Jones | A47K 1/09 211/66 |
| 1,903,796 A | * | 4/1933 | Smygel | A47L 13/512 211/113 |
| 2,623,642 A | * | 12/1952 | Looney | A47F 7/0028 211/65 |
| 2,707,052 A | * | 4/1955 | Brown | A47K 1/09 211/120 |
| 2,974,804 A | * | 3/1961 | Maro | B25H 3/04 211/70.6 |

(Continued)

*Primary Examiner* — Jennifer E Novosad
(74) *Attorney, Agent, or Firm* — McClure, Qualey & Rodack, LLP

(57) ABSTRACT

A tool holder designed to attach to a vertical structure, such as a wall or a common pegboard storage attachment board, and designed for use with common hand tools such as screwdrivers. The tool holder has at least one and optionally, a plurality of front facing slots to allow for ease of loading. The slots have side walls which taper at varying angles in order to accommodate various tool dimensions. The surface of the tool holder to position the tool in the plumb position, or can be designed to position the tools in a leaning position in order to create a biased center of gravity and provide for improved stability. The tool holder has uniquely designed attachment mechanisms for secure attachment onto varying dimensions of common pegboard thicknesses, and common pegboard mounting hole diameters.

7 Claims, 16 Drawing Sheets

(56) References Cited

U.S. PATENT DOCUMENTS

| | | | | |
|---|---|---|---|---|
| 3,095,092 A * | 6/1963 | Magarian | B25H 3/04 | 211/70.6 |
| 3,698,563 A * | 10/1972 | Gordon | A47F 5/08 | 211/60.1 |
| 4,159,773 A * | 7/1979 | Losenno | A47G 29/08 | 211/70.6 |
| 4,208,227 A * | 6/1980 | Cowan | A63B 55/00 | 206/315.6 |
| 4,917,337 A * | 4/1990 | Gridley | A47F 5/0823 | 248/220.43 |
| 5,255,799 A * | 10/1993 | Haynes | A63D 15/10 | 211/68 |
| 5,487,475 A * | 1/1996 | Knee | A47G 25/005 | 211/70.8 |
| 5,617,951 A * | 4/1997 | Wick | A63B 55/00 | 206/315.2 |
| 6,202,865 B1 * | 3/2001 | Kuo | A47F 5/0815 | 211/70.6 |
| 6,244,447 B1 * | 6/2001 | Frieze | A61B 19/0271 | 206/370 |
| 6,907,999 B1 * | 6/2005 | Carlin | A47F 7/142 | 211/120 |
| 6,959,823 B2 * | 11/2005 | Jun | B65D 25/103 | 211/41.18 |
| 7,237,685 B2 * | 7/2007 | Keegan | A01K 97/08 | 211/60.1 |
| 7,950,534 B2 * | 5/2011 | Kao | B25H 3/04 | 211/70.6 |
| 8,307,997 B2 * | 11/2012 | Jonas | H01L 21/67313 | 211/41.18 |
| 2004/0022607 A1 * | 2/2004 | Lim | H01L 21/67313 | 414/222.01 |
| 2006/0243686 A1 * | 11/2006 | Grayson | A47B 81/005 | 211/70.6 |
| 2007/0125726 A1 * | 6/2007 | Seo | H01L 21/67028 | 211/41.18 |
| 2008/0000853 A1 * | 1/2008 | Huang | A47F 7/0028 | 211/70.6 |
| 2009/0166305 A1 * | 7/2009 | Hsieh | A47F 7/0028 | 211/70.6 |
| 2009/0184070 A1 * | 7/2009 | Kao | B25H 3/04 | 211/70.6 |
| 2009/0261049 A1 * | 10/2009 | McQuary | A47F 7/0028 | 211/70.7 |
| 2010/0065519 A1 * | 3/2010 | Nguy | B25H 3/04 | 211/70.6 |
| 2010/0320338 A1 * | 12/2010 | Chen | A47F 7/0028 | 248/121 |
| 2012/0152871 A1 * | 6/2012 | Kao | A47F 5/0846 | 211/70.6 |
| 2015/0190922 A1 * | 7/2015 | Neal | F16M 13/022 | 211/70.6 |

* cited by examiner

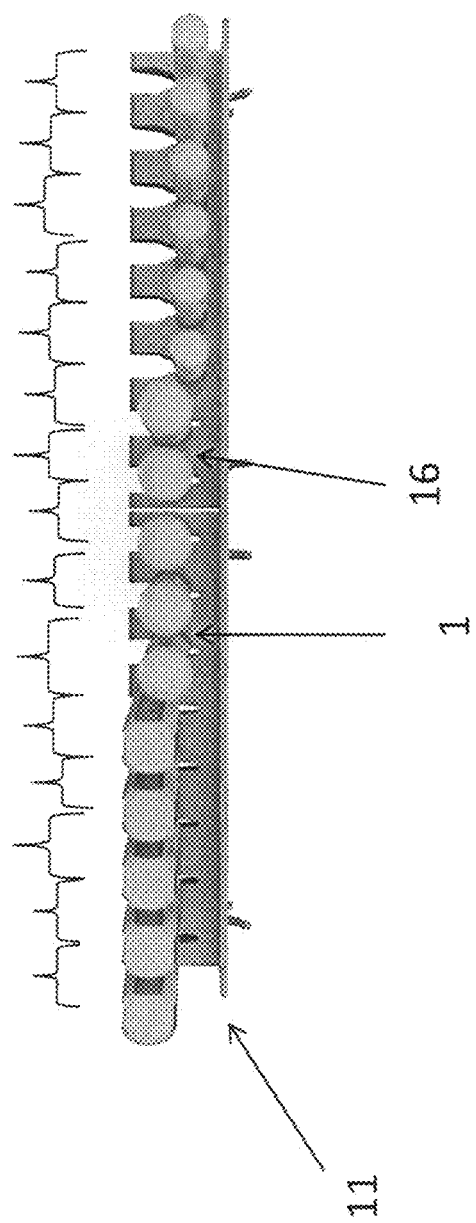

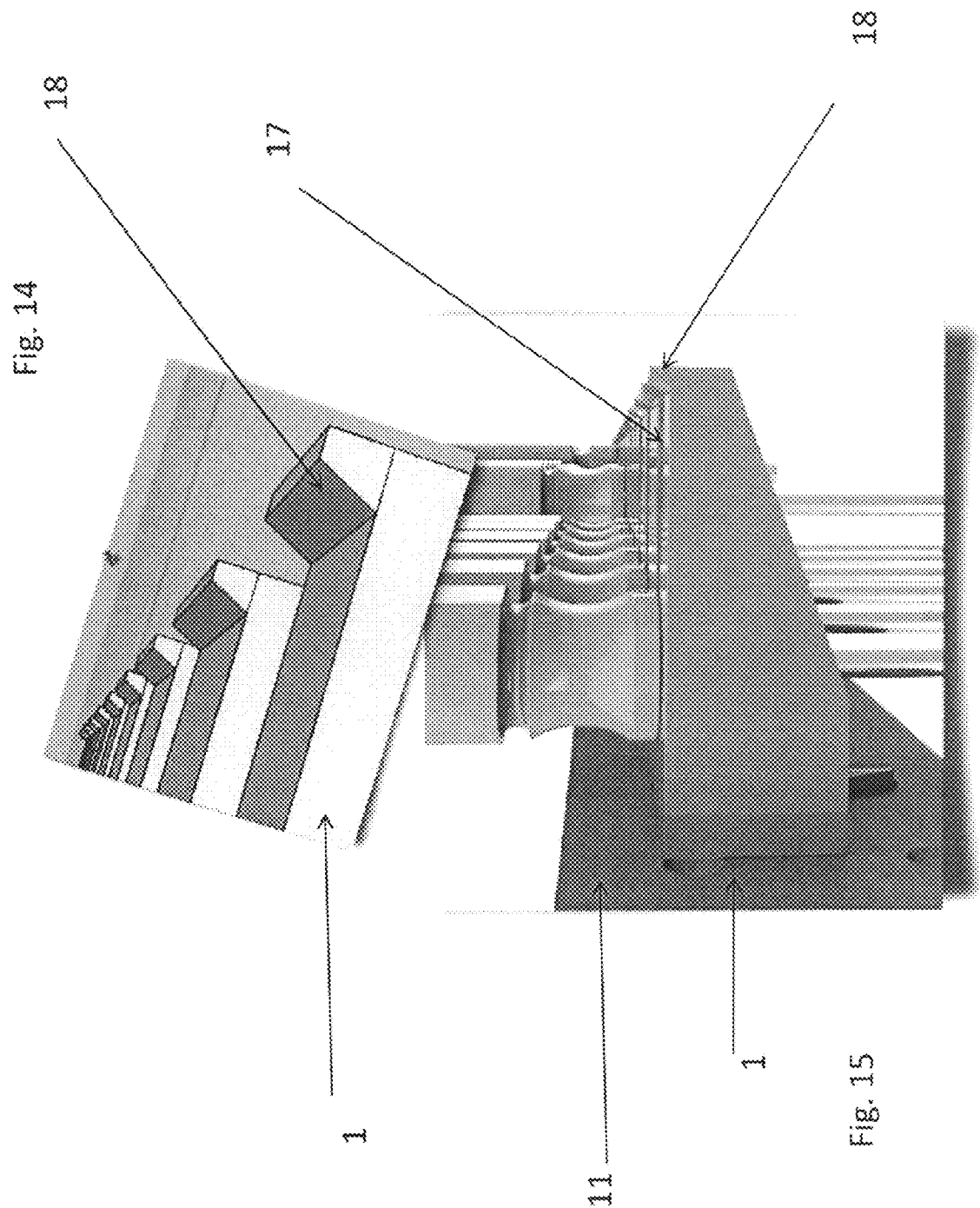

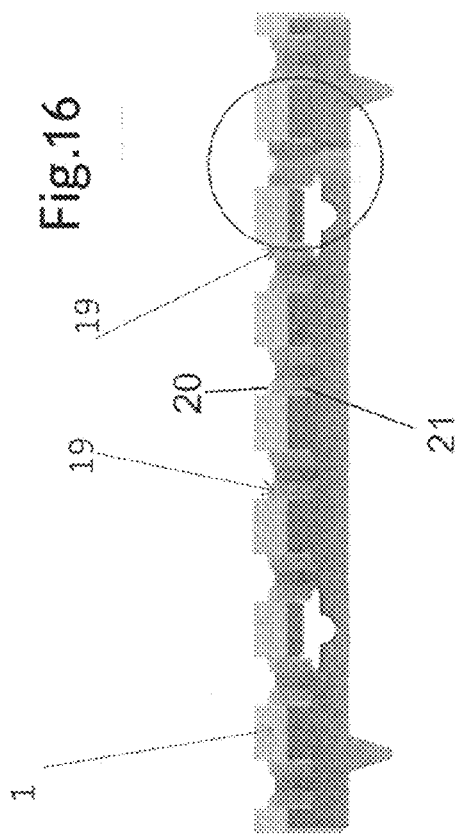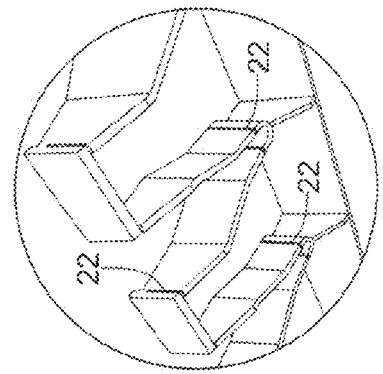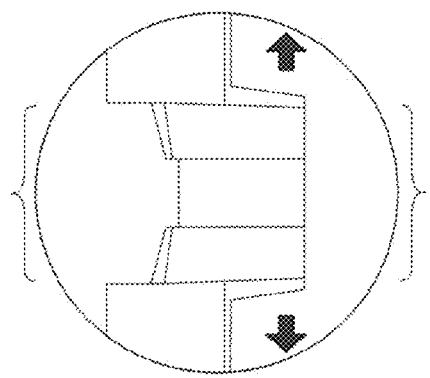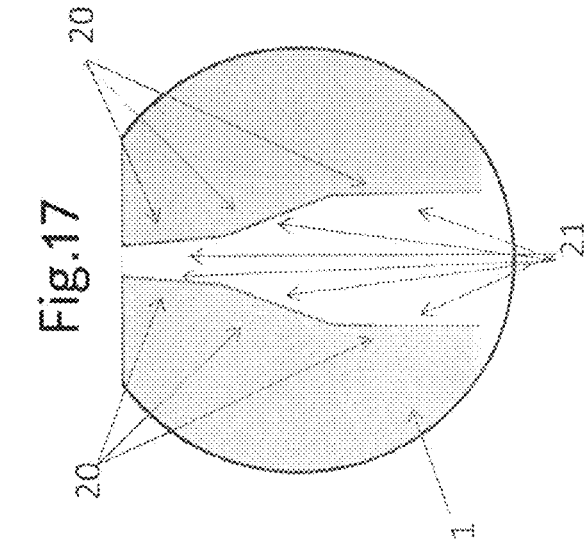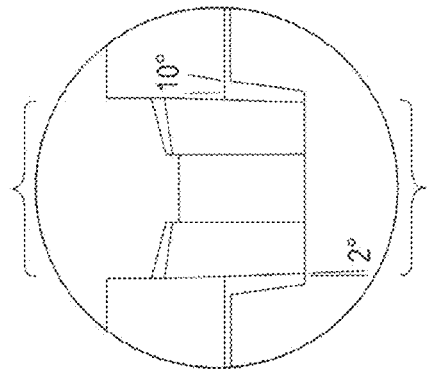

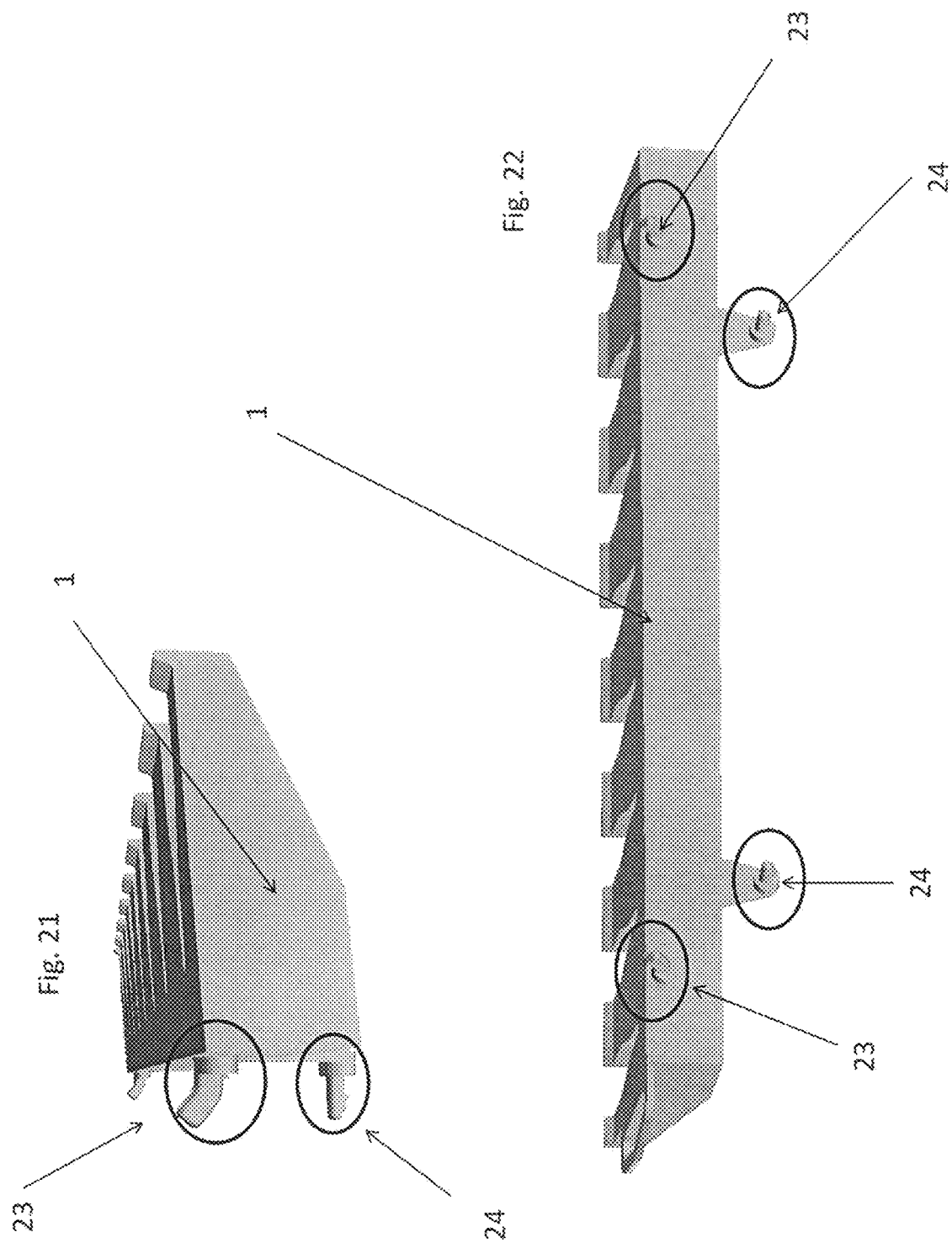

TOOL HOLDER

BACKGROUND

This disclosure relates to tool storage devices that are commonly mounted to vertical surfaces, wherein specific hand tools can be placed into the devices for storage and organization.

A problem is often encountered with current devices not providing for adequate and desired stability of tools that are intended to be stored, specifically with respect to hand tools with varying shaft diameters. Additionally, due to the varying nature of the hand tools, current devices do not allow for a consistent, uniform and organized presentation of the tools when being stored. Additionally, current devices can require certain attachment methods of the intended tools onto the device, in ways and manners that are less than ideal or convenient for easy storage, retrieval, and space utilization. Additionally, current devices that are intended for application onto common pegboard do not adequately provide a means to attach to varying dimensions of pegboard common in the marketplace, without undesirable tolerances in order to allow mounting.

SUMMARY

A tool holder designed to to attach to a vertical structure, such as a wall or a common pegboard storage attachment board is disclosed. The tool holder is designed for use with common hand tools such as flat head or phillips head screw drivers, nut drivers, tools consisting of a large handle and a narrower diameter shank and the like. The tool holder is normally mounted horizontally onto common pegboard, and is designed with a number of front facing slots by which to store tools. The tools are loaded into the front or outward facing side of the tool holder; as opposed to being loaded downwardly through holes. The front facing nature of the design, precludes the operator from needing additional head room or clearance above the tool holder as is otherwise required to lift a tool high enough above the tool holder so that the lowest part of the tool is above the surface of the tool holder, or when lowering the tool into a hole on the tool holder for storage. Rather, a front facing slot allows the tool to be directly loaded and stored into the front of the tool holder for storage, and does not require addition head-room clearance above for normal and intended operation.

The tool holder slots are designed with sloping or angled side-walls that vary in taper angle from the front to the back of the slots to accommodate varying diameter shafts of the hand tools, while still allowing for a snug and secure fit. The inner taper angle of the sidewalls in relation to the centerline of the slot changes as the slot goes from the forward most portion of the slot opening, then changing to a greater angle, then changing to a lesser angle. At the rear most portion of each slot is a narrower slot, specifically designed to hold tools with significantly narrower shank diameters, while still providing a snug fit. The walls of the slots are intended to serve as tangent points to any tool shank, creating a secure resting point, while allowing maximum surface contact between the tool holder top surface area, and the bottom facing surface of the primary handle of the tool. This maximum surface contact also contributes to maximum friction between the tool and the tool holder, allowing for the maximum stability for the tool while in the tool holder.

In addition, the tool holder may have a retention lip along the leading edge of the tool holder, in order to limit or prevent tools from falling forward out of the tool holder due to common vibration or other unintentional movement.

The tool holder slots can be alternatively designed to be wider at the top, and narrower at the bottom; wherein the walls of the slots are not parallel, in order to pinch the tool shaft by means of a lateral friction force, which acts as a retention mechanism.

The top surface of the tool holder that is tangent with the underside of the tool handles, can be designed to be parallel to the ground, thereby holding the tools in a plumb orientation. Additionally, the top surface of the tool holder that is tangent with the underside of the tool handles, can also be alternatively designed to be tilted in any preferred direction, in order to effectively provide for a means that the tool will be held in a leaning position, and not in a plumb position. This is done in order to give a bias to the center of gravity of the tool as it rests in the tool holder, and helps prevent and reduce undesirable wobble motion if the tool holder is jarred/bumped or otherwise moved.

The tool holder is also designed in a manner to maximize lateral storage and can mount end to end on a common pegboard, without any lost area of pegboard being unused or uncovered by the tool holder. Further, the slots are designed in such a manner that the centerline of each slot is equidistant from the other. Additionally, the length of the tool holder is designed in a manner that allows for the tools to be mounted side by side, while maintaining the same distance between the slots and between slots of any adjoining tool holders.

The tool holder is designed in a way to allow for primary attachment to pegboard, but can be affixed directly to any surface. The tool holder is designed to primarily attach to common pegboard through the use of a staged peg design, which enables and accommodates a snug and desirable fit onto common pegboards of varying thicknesses and varying hold diameters.

BRIEF DESCRIPTION OF THE DRAWINGS

FIG. 11 is a schematic top plan view illustrating tool spacing;

FIG. 14 is a partial, enlarged view of the outer ends of the tool holder arms;

FIG. 15 is a partial, enlarged, side, elevational view showing tools loaded in the holder;

FIG. 16 is an enlarged front elevational view of the holder;

FIG. 17 is a diagrammatical view of an individual slot;

FIGS. 18-20 are enlarged schematic views of slots holding tools;

FIG. 21 is a partial, enlarged perspective view showing the mounting pegs;

FIG. 22 is a rear elevational view of the holder;

DETAILED DESCRIPTION OF THE INVENTION

Figure 1:
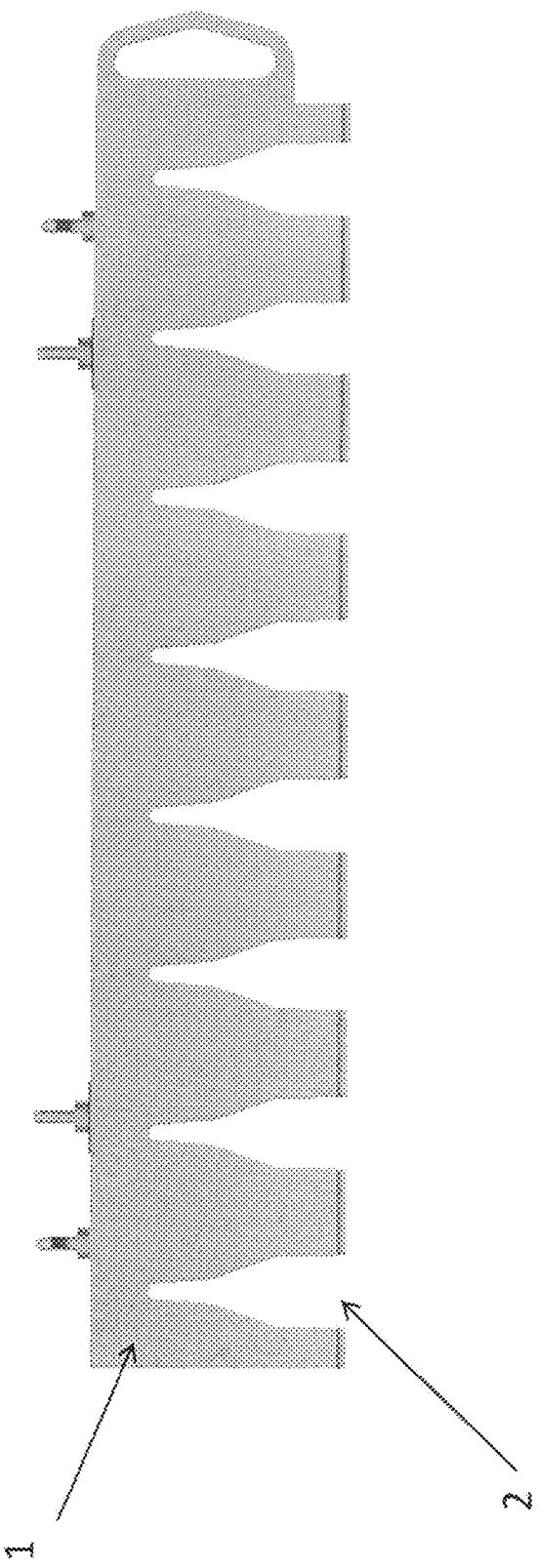
FIG. 1 is a top plan view of the present tool holder.

The tool holder is normally made of injection molded plastic, but can also be made of other materials or processes in order to achieve the same form; such as blow molded plastic, rotational molded plastic, wood, cast or machined metal, and the like.

The invention is intended to be used with common pegboard, but can also be directly attached to any vertical surface for the same purposes of storing tools.

Referring to the drawings, a tool holder 1, in accordance with a preferred embodiment of the present device, is shown.

As shown in FIG. 1, a tool holder 1 is illustrated, with front facing, variably tapered slots 2. The present embodiment is shown containing multiple slots, although any number of slots is contemplated by this disclosure, from a single slot to multiple slots.

Figure 2:
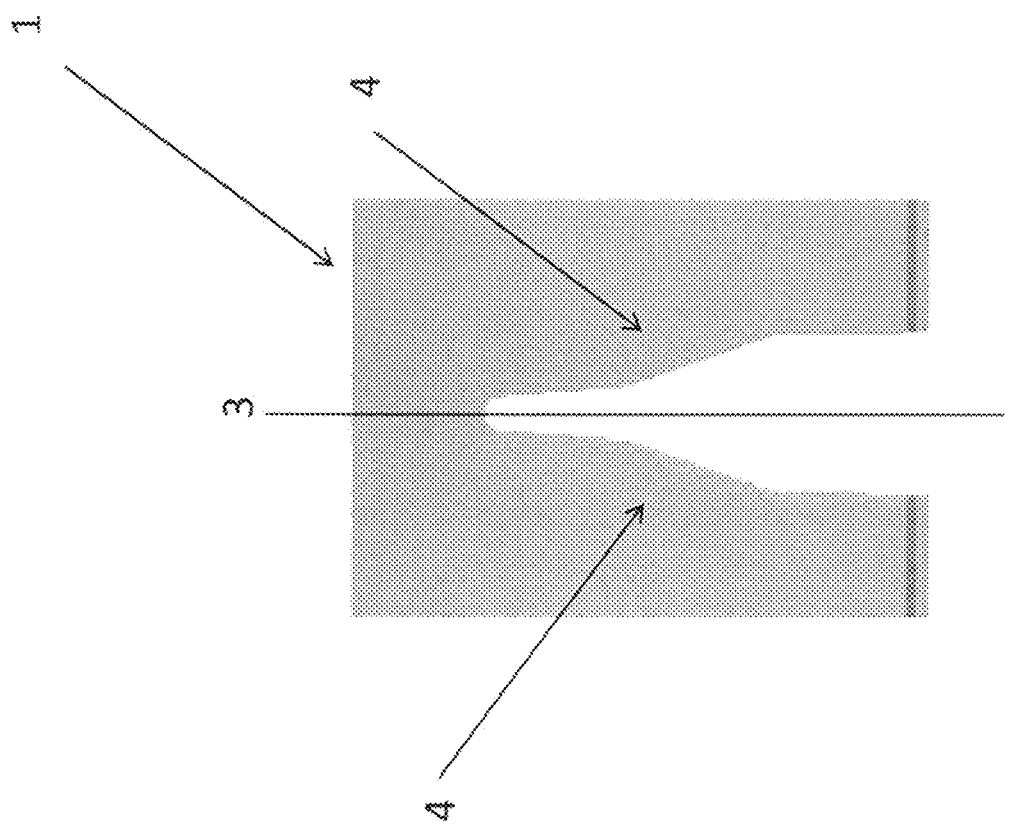
FIG. 2 is a partial, top plan view of one section of the holder.

As shown in FIG. 2, the arms 4, of tool holder 1, are symmetrical in nature relative to the center line 3 of the tool holder 1 and are defined by side walls 19. The tool holder has a base 2*b* and the arms 4 project radially outwardly therefrom. While it is common that the arms may be of symmetrical orientation, it is contemplated that asymmetrical arms may be utilized for an alternate embodiment. The base 2*b* has a substantially planar rear surface, so as to fit more or less flush with a supporting pegboard, wall, etc. The radial projection of the arms is generally 90 degrees, although variation from a perpendicular orientation is contemplated and is disclosed hereinbelow.

Figure 3:
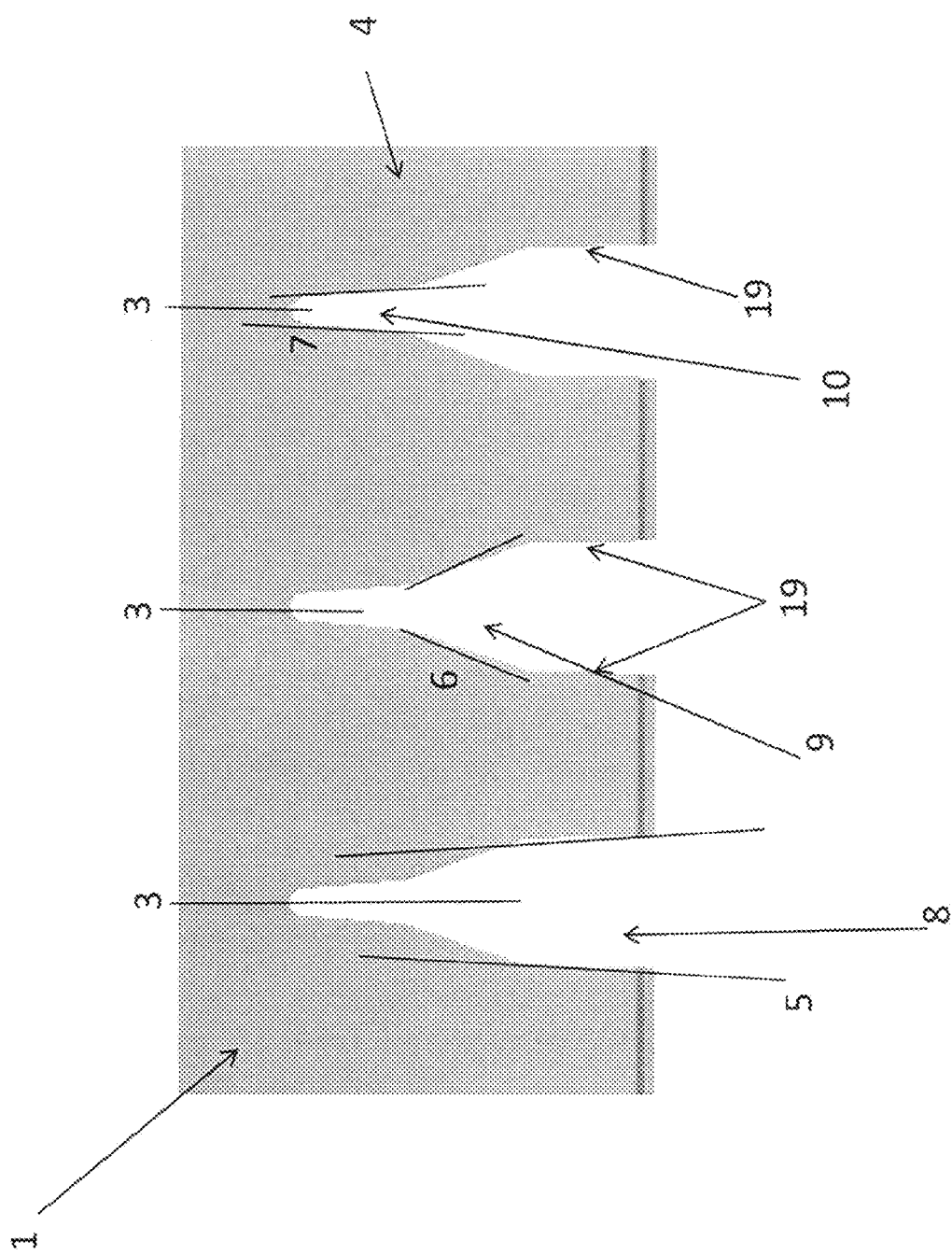
FIG. 3 is a partial, top plan view of several of the sections.
Figure 8:
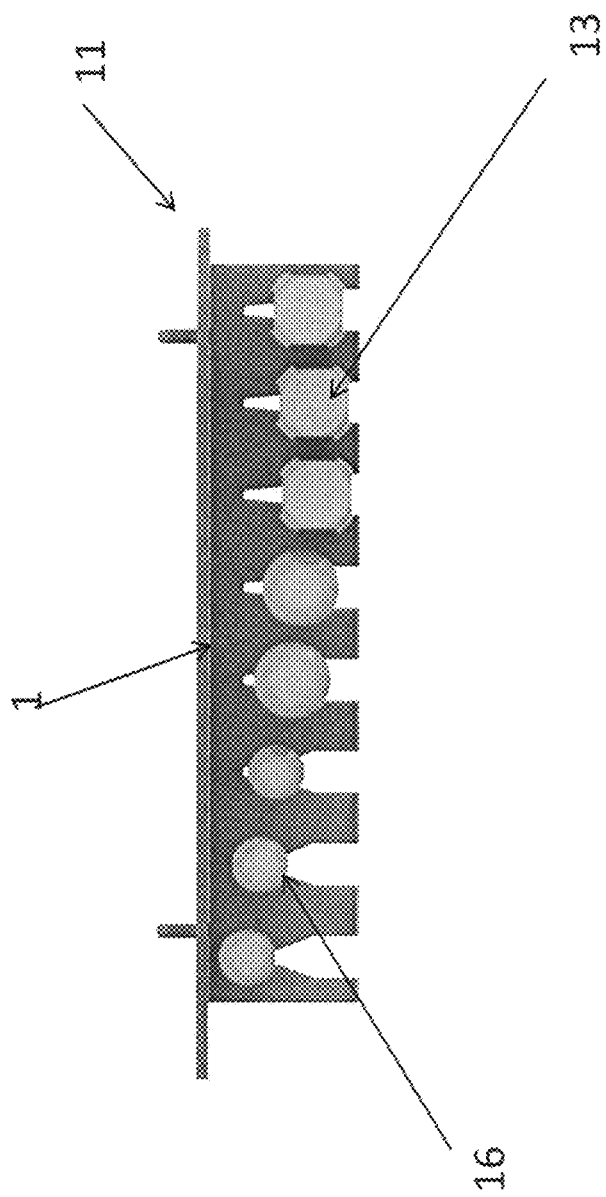
FIG. 8 is a top plan view of the holder in a loaded state.

As shown in FIG. 3, the tool holder 1, includes and is comprised of one or more variably angled tapered slots 2, wherein the side walls 19 narrow as they get closer together, and which generally begin at their widest point at the front of the opening of the slot, and generally taper to a more narrow width. The slots 2, are comprised of an initial opening 5 which is of a determined angle in relation to the centerline 3. As a preferred embodiment, as the slot goes farther back from the front opening, the angle taper of the side walls increases 6, in relation to the centerline of the slot. As the slot goes even farther back into the tool holder and away from the front opening, the taper angle of the side walls again changes to a decreasing angle 7, in comparison to the next outermost angle of tapering side walls. This is a preferred embodiment of the changing of angled tapers of the side walls, but it is contemplated in this disclosure that the rate of the angle changes of the tapering side walls may increase or decrease at any stage from the front opening to the final back of the tapered slot. As depicted in FIG. 3, the changes in angle are visibly discernable. Thus, referring to the embodiment of FIG. 3, the slots have at least two distinct regions, and as shown in FIG. 3, there are 3 distinct regions. The first, and widest region, is defined by the entrance 8 to the slot and the point 19*a* where the side walls begin to taper inwardly. The second, narrower region, is defined by the point 19*a* and a point 20*a*, where the side walls being to taper further inwardly. The third, and narrowest region, is defined by the point 20*a* and the rear wall 18*b*. The converging side walls thus form a series of abutments against which a tool shank is placed when inserted into a particular slot. This is seen in FIG. 8 where wide shank tools reside in the widest region, narrower shank tools reside in the second, narrower region, and thin shank tools reside in the third, narrowest region. However it is contemplated that that change in angle may be achieved through either a distinct change in angle of a line, or by way of a gradual change or radius side-wall dimensions. It is also contemplated that there would be at least 1, but no limit to how many, changes in angle of the tapering side walls.

Figure 4:
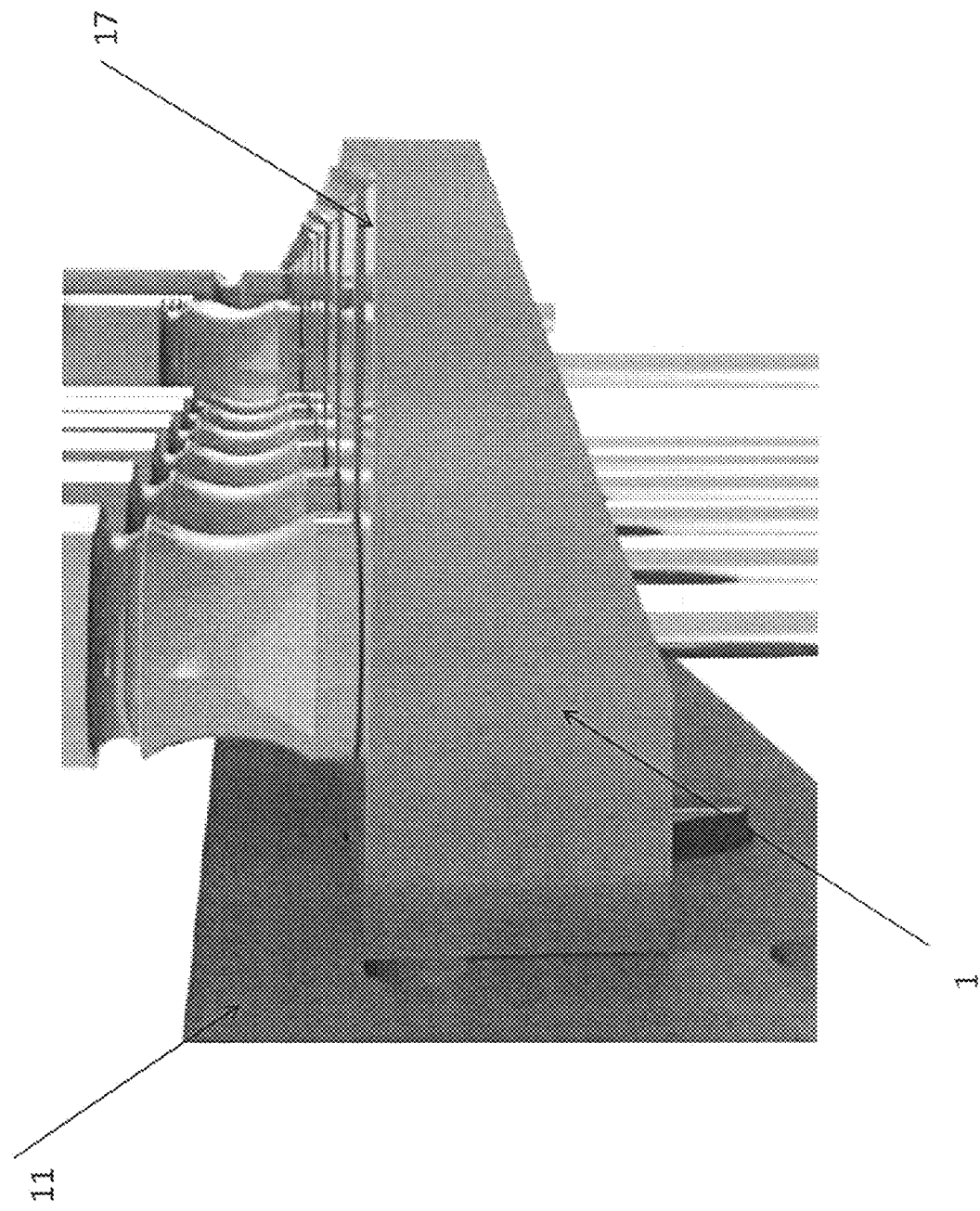
FIG. 4 is a side elevational view of the holder in a loaded state.
Figure 5:
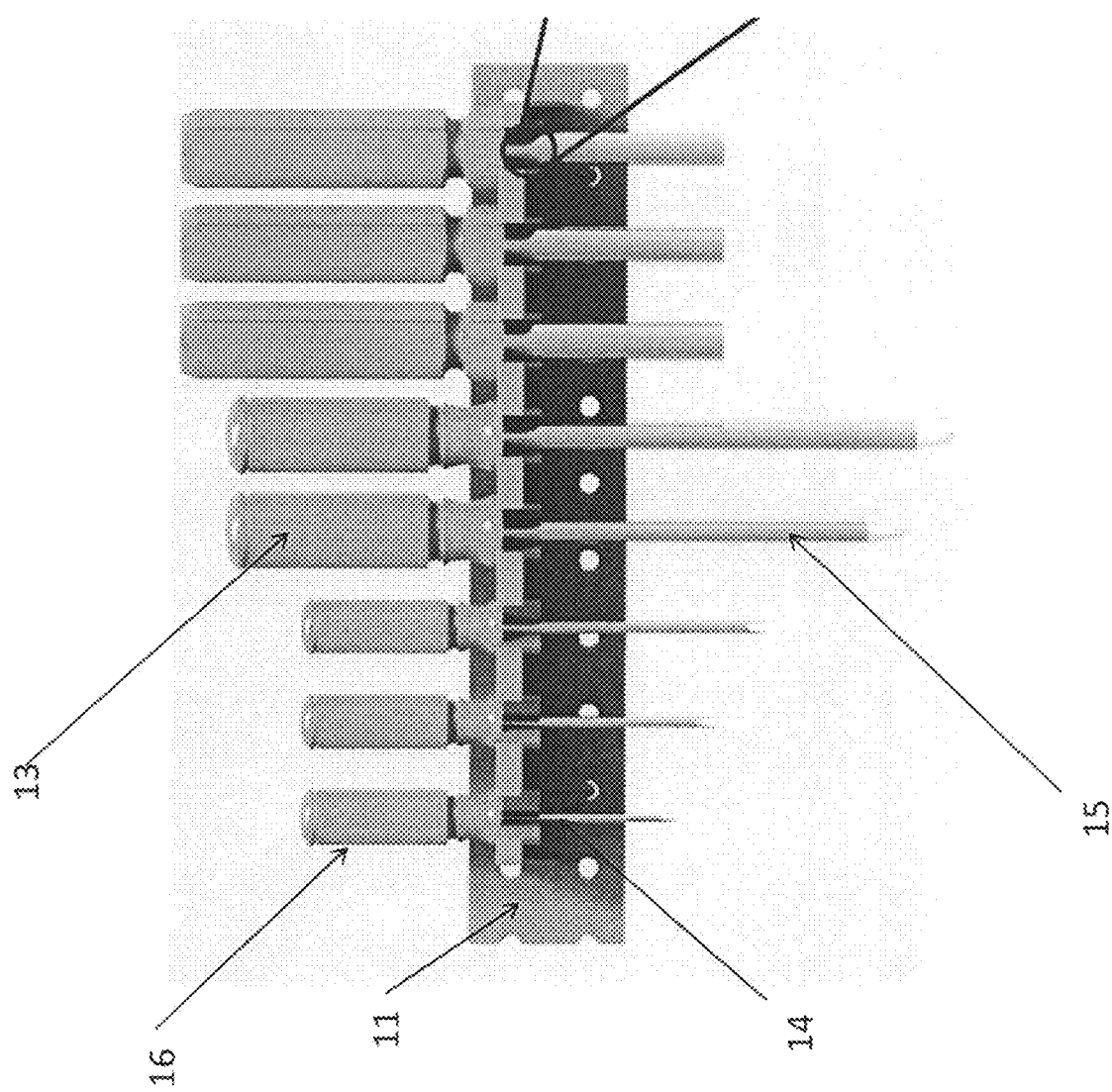
FIG. 5 is an enlarged front elevational view of the holder in a loaded state.

As shown in FIG. 4, the tool holder 1 is mounted to a common pegboard 11, whereby the top surface 17 of tool holder 1 is maintained at a level parallel with the ground As shown in FIG. 5, the tapered slots of the tool holder are able to hold screwdrivers or other items with larger handles 13 with larger diameter shafts 15, as well as smaller handle tools 16 with smaller diameter shafts 14.

Figure 6:
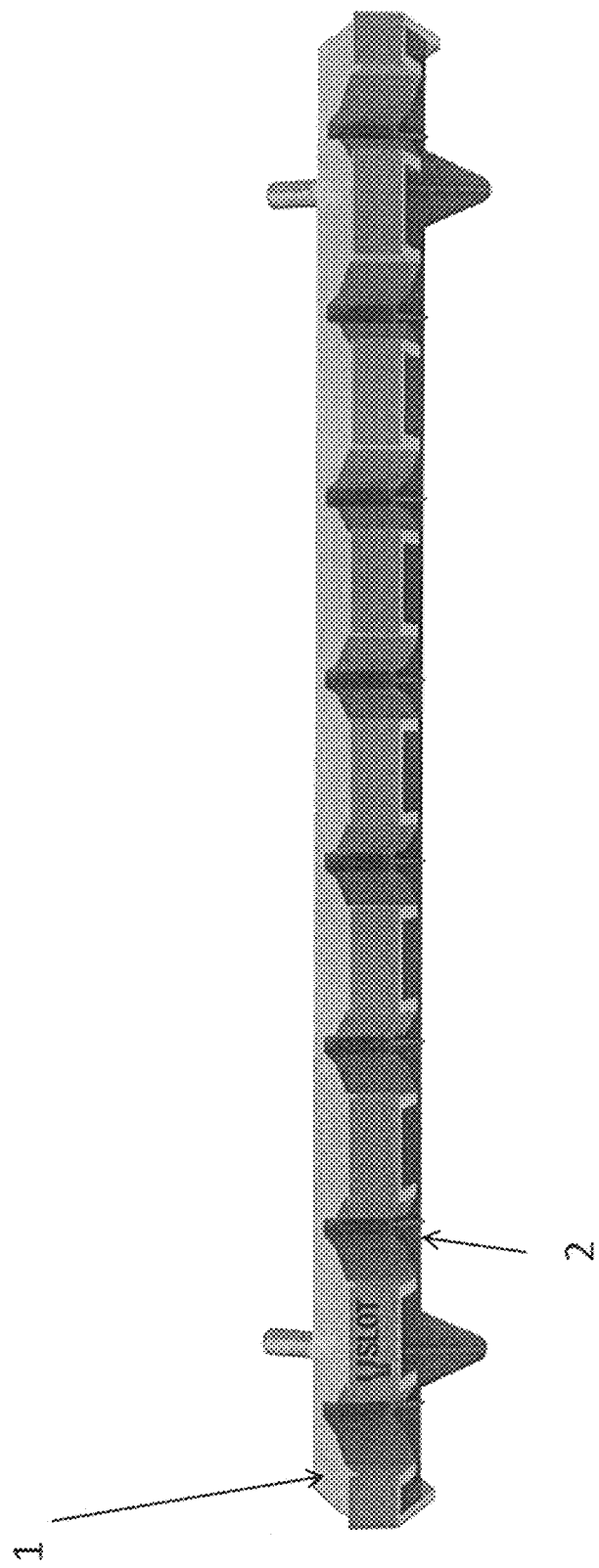
FIG. 6 is a front elevational view of the holder in an unloaded state.

Shown in FIG. 6 is a frontal view of tool holder 1 with the front opening tapered slots 2.

Figure 7:
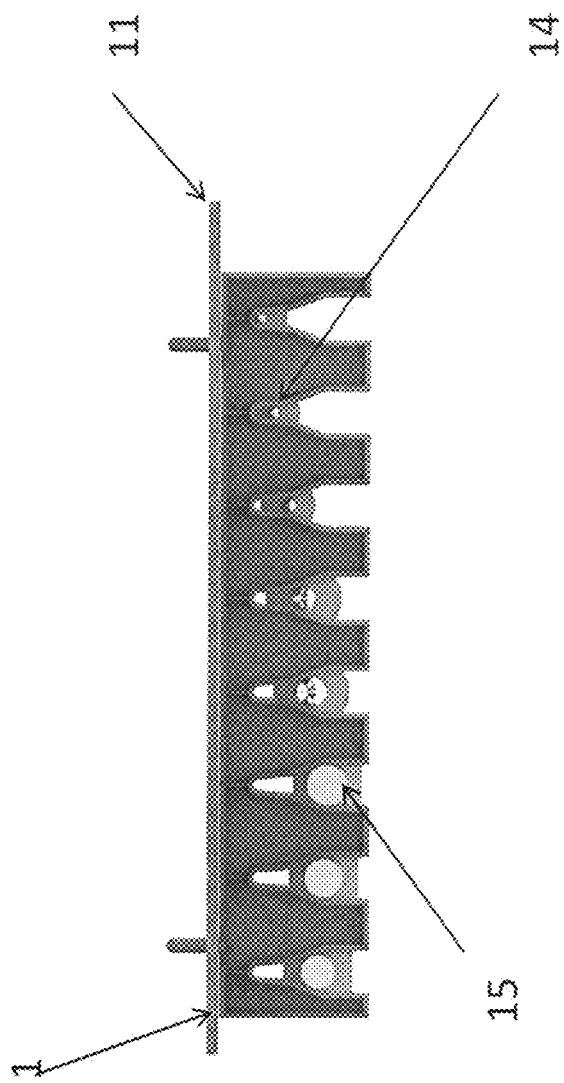
FIG. 7 is a bottom plan view of the holder in a loaded state.

As shown in FIG. 7, the underside of the tool holder 1 is mounted to pegboard 11, and it can be seen that varying size tool shanks, here a large diameter tool shank 15 and a small diameter tool shank 14, are able to securely be inserted into the tapering slots, to a point where the tool shank becomes tangent with the sidewalls of the tapered slots.

As shown in FIG. 8, the top view of the tool holder 1 mounted to pegboard 11, wherein depicted are the varying size handles of a small handle tool with small diameter shank 16, and a larger diameter handle tool with larger diameter shank 13, each securely inserted into the tapering slots.

Figure 9:
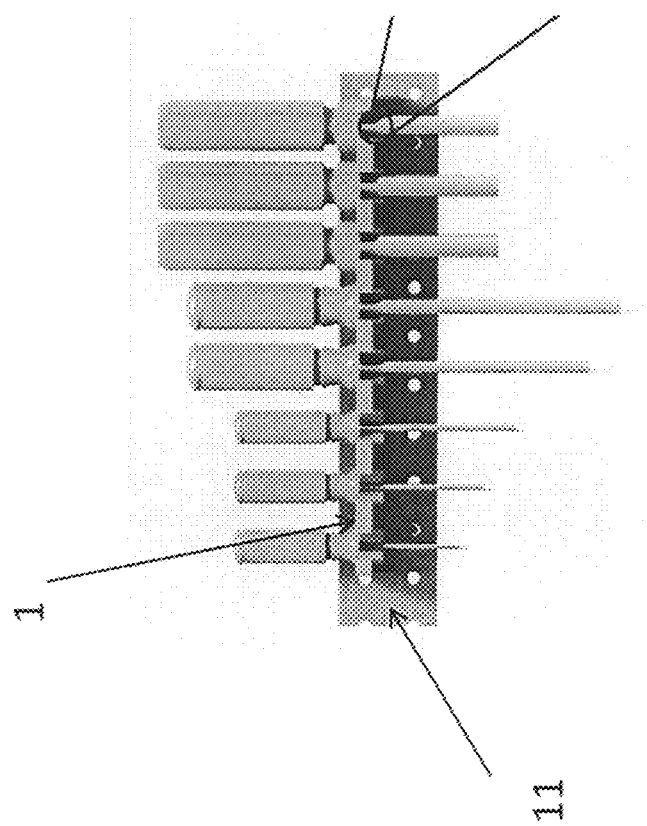
FIG. 9 is a front elevational view of the holder in a loaded state.

As shown in FIG. 9, the tool holder 1 is mounted to pegboard 11, and shows the organized display and storage of the tools described, wherein the centerline of each tapered slot is equidistant from the other adjacent slot(s).

Figure 10:
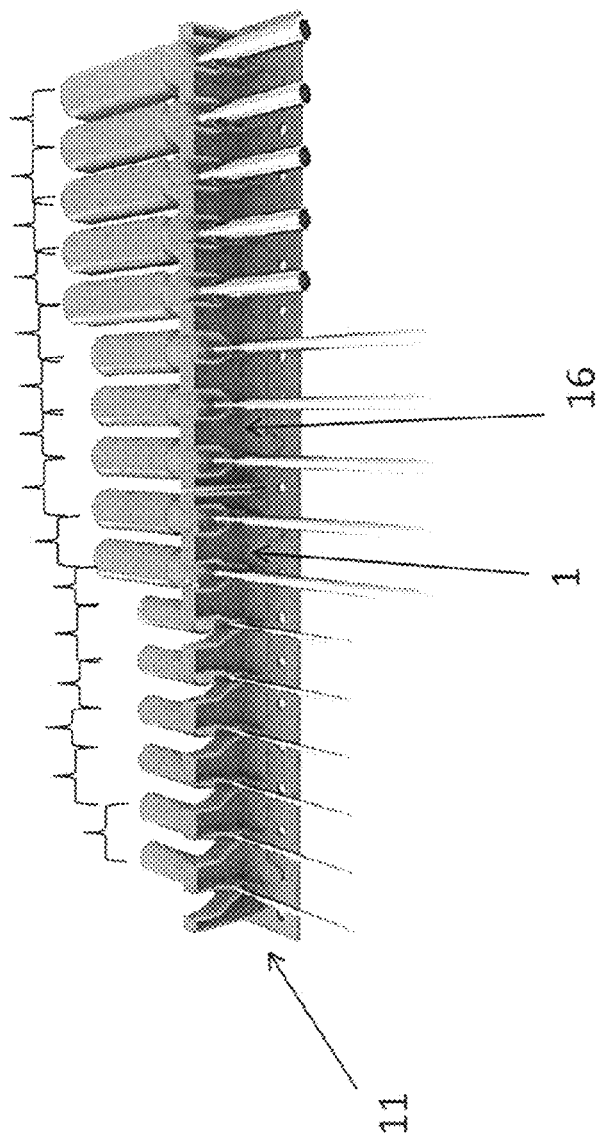
FIG. 10 is a schematic, perspective view of the holder, illustrating the relative spacing of the tools.

As shown in FIG. 10, the underside perspective view of the tool holders 1 and 16, mounted side by side, wherein the centerline of each tapered slot is equidistant from an adjacent slot(s), including when passing from one tool holder 1, to an adjacent tool holder 16, when the tool holders are mounted side by side on a pegboard 11.

As shown in FIG. 11, the top view of the tool holders 1 and 16, mounted side by side, wherein the centerline of each tapered slot is equidistant from an adjacent slot(s), including when passing from one tool holder 1, to an adjacent tool holder 16, when the tool holders are mounted side by side on a pegboard 11.

Figure 12:
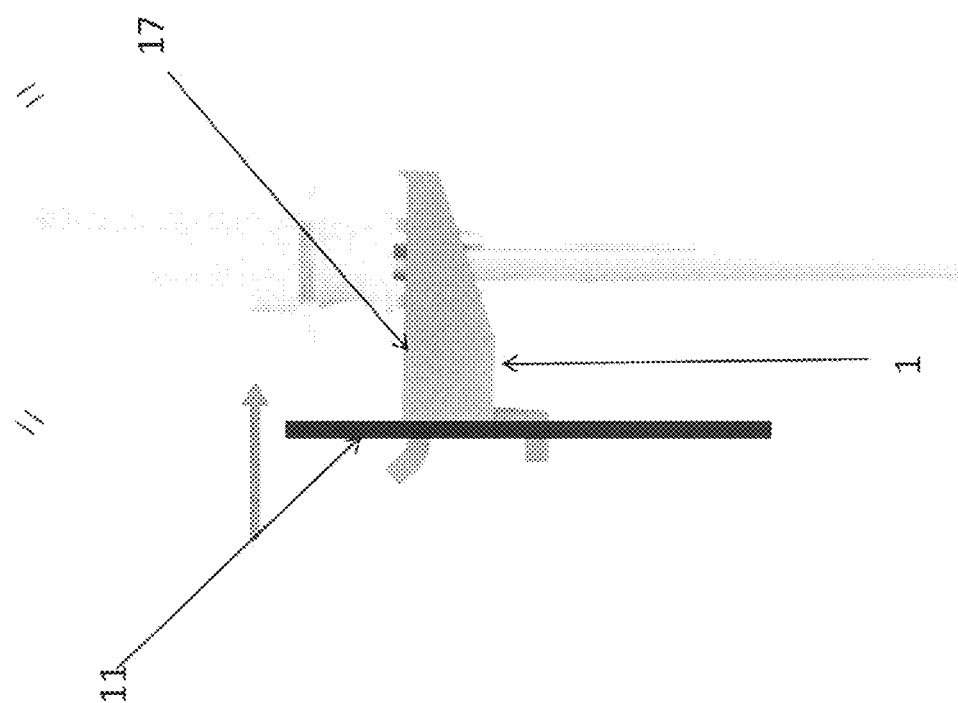
FIG. 12 is a schematic view illustrating tool mounting.

As shown in FIG. 12, the tool holder 1 is mounted to pegboard 11, wherein the top surface 17 of tool holder 1 is held at a level parallel with the ground, and the tool is therein held in a plumb and vertical position. It has been established that in the plumb position, the tool has a centerline center of gravity and is more prone to wobbling if disturbed.

Figure 13:
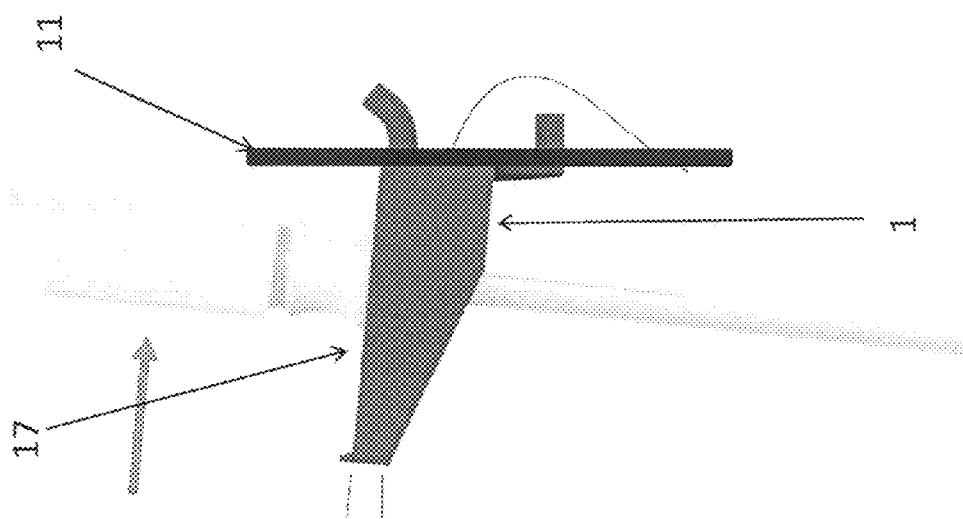
FIG. 13 is a side elevational view of an alternate embodiment of the tool holder.

As shown in FIG. 13, the tool holder 1 is mounted to pegboard 11, wherein the top surface 17 of tool holder 1 is held at a rearward leaning angle in relation to the ground parallel or plumb position, and the tool is therein held at an angle and not in a plumb and vertical position. It has been established that when angled back slightly, the tool center of gravity shifts, and it becomes more stable and less prone to wobbling when disturbed.

As shown in FIG. 14, the tool holder 1 optionally incorporates a retention ridge 18.

As shown in FIG. 15, the retention ridge 18 is elevated above the upper surface level 17 of the tool holder, and blocks the tool handle from sliding forward out of the slot and helps to prevent the tool being held from unintentionally becoming detached from the tool holder.

As shown in FIG. 16, the side walls 19 of tool holder 1 are shown.

As shown in FIG. 17, optionally, the side walls 19 of the tapering slots can be constructed in a manner to be of differing dimensions from the top of the side walls, to the bottom of the side walls, 20 and 21, with the preferred embodiment being that the top of the side walls are wider than then bottom of the side walls; although any combination is contemplated in this invention.

As shown in FIG. 18, optionally, the side walls of the tapering slots can be constructed in a manner to be of differing dimensions from the top of the side walls, to the bottom of the sidewalls, shown here as varying from 10° down to 2°. FIG. 18 depicts the slot without a tool inserted. The bottom of the slot is narrower than the top of the slot, at any point along the tapered angled wall.

As shown in FIG. 19, optionally, when a tool shank is inserted into the slot, the sidewalls can be flexible and can expand outwardly, thereby providing a lateral frictional force to help secure the tool in place in the tool holder.

As shown in FIG. 20, optionally, the side-walls of the tapered slots can be relief cut, to allow for greater flex and spring force when a tool shank is pressed into a slot.

As shown in FIG. 21, the tool holder 1 includes attachment pegs 23 and 24 in order to attach to common pegboard. Peg 23 is designed with an upward angle. Peg 24 is oriented generally parallel to the ground.

As shown in FIG. 22, tool holder 1 includes at least 1 attachment peg 23 or 24, but it is contemplated that numerous pegs 23 or pegs 24 can be included.

Figure 24:
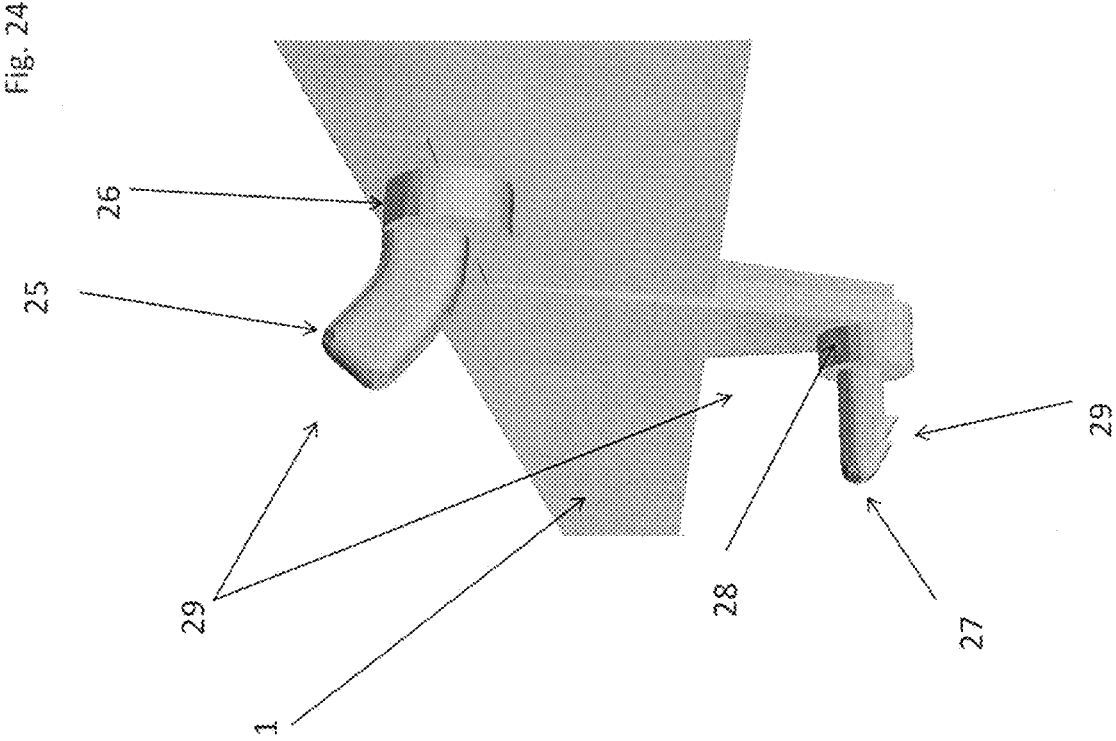
FIG. 24 is an enlarged, partial perspective view of the mounting pegs.
Figure 23:
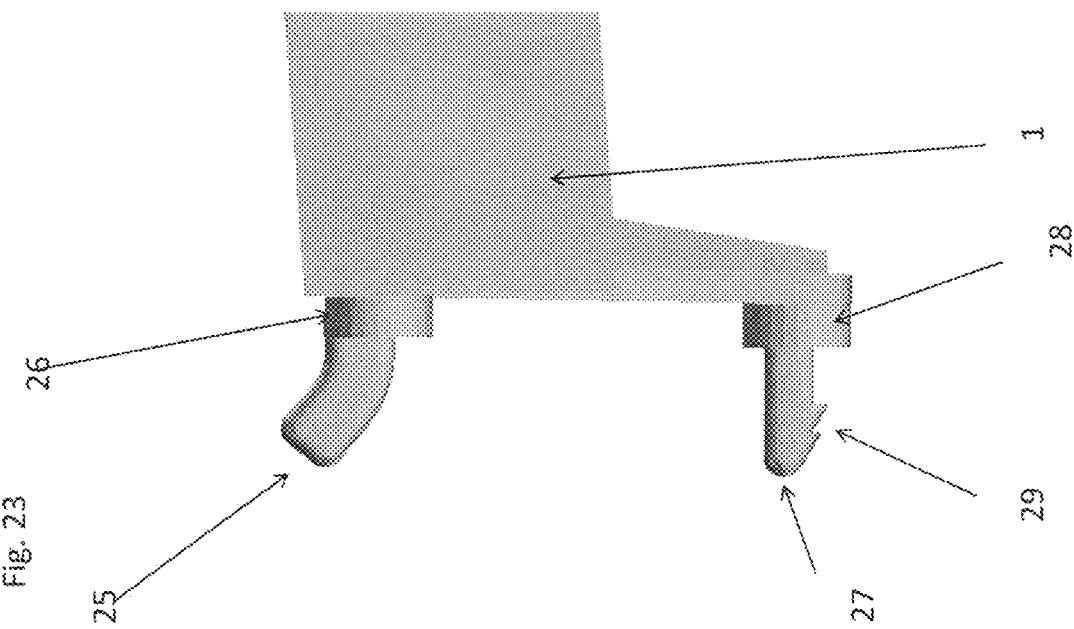
FIG. 23 is an enlarged, partial perspective view of the mounting pegs.

As shown in FIGS. 23 and 24, depicted are examples of peg designs of tool holder 1. The upper peg (23 from FIG. 21) is a dual stage peg. The outermost tip 25, is angled upwardly, and is of a specific smaller dimension, smaller diameter and thinner, than that of the base 26, and is intended to interface with common pegboard with smaller diameter mounting holes. The innermost portion of the top peg, base 26, is larger in diameter than tip 25. This larger diameter base 26 is intended to interface with common pegboard with larger diameter mounting holes. Lower peg 24, similarly, comprises an outermost tip peg design 27 that has a smaller diameter and is thinner, than that of base 28. The innermost portion of the lower peg, base 28 is larger in diameter than tip 27. This larger diameter base 26 is intended to interface with common pegboard with larger diameter mounting holes. The lower peg outermost tip 27 also incorporates a serrated edge design 29 intended to tightly secure the tool holder to the desired pegboard. Where the tool holder is to be mounted to a wall or other solid surface, the pegs can be removed and the holder secured with other fastening means such as screws, tape, adhesives, and the like.

While an embodiment of a tool holder, and modifications thereof, have been shown and described in detail herein, various additional changes and modifications can be made, without departing from the scope of the present disclosure.

I claim:

1. A tool holder for storing at least two different sized hand tools and designed to be mounted on a pegboard disposed on a vertically extending surface, the tool holder comprising a planar base member having a front surface and a rear surface and having a plurality of arms projecting substantially horizontally from said front surface of said base member and defining a plurality of V-shaped slots therebetween for receiving the tools, whereby each slot having an entrance, a rear wall, and side walls that taper inwardly from the entrance of the slot toward the base member, with each slot having a first wide section defined approximate said entrance, a second narrower section defined approximate said rear wall, and including a third section intermediate said first and second sections and being narrower than said first section and wider than said second section, such that each slot being configured to hold a first one of the at least two different sized hand tools in a substantially vertical manner in said first section and a second one of the at least two different sized hand tools in a substantially vertical manner in said second section; and a plurality of pegs extending from said rear surface of said base member and designed to engage the pegboard.

2. The tool holder as defined in claim 1 in which said arms also project upwardly from said base member.

3. The tool holder as defined in claim 2 in which said arms have an outer end with a retention ridge disposed at said outer end for helping to retain said tools in said slots.

4. The tool holder as defined in claim 1 in which said arms have an outer end with a retention ridge disposed at said outer end for helping to retain said tools in said slots.

5. The tool holder as defined in claim 4 in which said arms also project upwardly from said base member.

6. The tool holder as defined in claim 1 in which said arms have side walls, said side walls having upper and lower edges, with said upper edges spaced further apart than said lower edges.

7. The tool holder as defined in claim 6 in which said side walls include relief cuts for allowing said side walls to flex outwardly and inwardly for gripping the tools.

* * * * *